US012608813B2

(12) United States Patent
Kong et al.

(10) Patent No.: US 12,608,813 B2
(45) Date of Patent: Apr. 21, 2026

(54) IMAGE SEGMENTATION METHOD FOR A TARGET OBJECT, DEVICE, AND STORAGE MEDIUM

(71) Applicant: BEIJING YOUZHUJU NETWORK TECHNOLOGY CO., LTD., Beijing (CN)

(72) Inventors: Tao Kong, Beijing (CN); Ya Jing, Beijing (CN); Lei Li, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 381 days.

(21) Appl. No.: 18/251,228

(22) PCT Filed: Sep. 27, 2021

(86) PCT No.: PCT/CN2021/120815
§ 371 (c)(1),
(2) Date: Apr. 28, 2023

(87) PCT Pub. No.: WO2022/089115
PCT Pub. Date: May 5, 2022

(65) Prior Publication Data
US 2023/0394671 A1 Dec. 7, 2023

(30) Foreign Application Priority Data

Oct. 30, 2020 (CN) .......................... 202011197790.9

(51) Int. Cl.
*G06T 7/11* (2017.01)
*G06T 3/40* (2024.01)

(52) U.S. Cl.
CPC .................. *G06T 7/11* (2017.01); *G06T 3/40* (2013.01); *G06T 2207/20221* (2013.01)

(58) Field of Classification Search
CPC ... G06T 7/11; G06T 3/40; G06T 2207/20221; G06T 2207/20081; G06T 2207/20084;
(Continued)

(56) References Cited

U.S. PATENT DOCUMENTS 10,643,072 B2 * 5/2020 Kottenstette ........ G06F 18/2413
10,818,386 B2 * 10/2020 Yao .................. G06Q 10/06315
(Continued)

FOREIGN PATENT DOCUMENTS

CN 102436583 A 5/2012
CN 107958460 A 4/2018
(Continued)

OTHER PUBLICATIONS

Written Opinion for International Application No. PCT/CN2021/120815, mailed Dec. 30, 2021, 10 Pages.
(Continued)

*Primary Examiner* — Mia M Thomas

(57) ABSTRACT

Provided are an image segmentation method and apparatus, a device, and a storage medium. The image segmentation method includes: fusing a visual feature corresponding to an original image with a text feature corresponding to a description language to obtain a multimodal feature, where the description language is used for specifying a target object to be segmented in the original image; determining a visual region of the target object according to an image corresponding to the multimodal feature and recording an image corresponding to the visual region as a response heat map; and determining a segmentation result of the target object according to the image corresponding to the multimodal feature and the response heat map.

17 Claims, 5 Drawing Sheets

Fuse a visual feature corresponding to an original image with a text feature corresponding to a description language to obtain a multimodal feature — S210

Perform correlation filtering on an image corresponding to the multimodal feature to obtain a visual region of a target object — S220

Record an image corresponding to the visual region as a response heat map — S230

Input the image corresponding to the multimodal feature and the response heat map into a target image segmentation model and acquire an output result of the target image segmentation model as a segmentation result of the target object — S240

(58) Field of Classification Search

CPC .......... G06T 2207/30128; G06T 7/194; G06F 18/256; G06V 10/25; G06V 10/462

See application file for complete search history.

(56) References Cited

U.S. PATENT DOCUMENTS

| | | | | |
|---|---|---|---|---|
| 10,878,173 | B2 * | 12/2020 | Morariu ........... | G06V 30/19173 |
| 11,282,198 | B2 * | 3/2022 | Lyman ................... | G16H 40/67 |
| 11,416,672 | B2 * | 8/2022 | Morariu ................. | G06N 5/046 |
| 11,507,072 | B2 * | 11/2022 | Ponnada .............. | G05B 19/406 |
| 11,615,567 | B2 * | 3/2023 | Harikumar ............ | G06V 10/82 |
| | | | | 382/173 |
| 11,636,085 | B2 * | 4/2023 | Yan ..................... | G06F 16/2456 |
| | | | | 707/769 |
| 12,080,056 | B1 * | 9/2024 | Rathi ..................... | G06V 20/50 |
| 2005/0265607 | A1 * | 12/2005 | Chang .................. | G06F 18/256 |
| | | | | 382/224 |
| 2018/0089531 | A1 * | 3/2018 | Geva .................... | G06V 10/763 |
| 2018/0268548 | A1 | 9/2018 | Lin et al. | |
| 2020/0012898 | A1 * | 1/2020 | Zhao ........................ | G06F 18/22 |
| 2020/0117951 | A1 * | 4/2020 | Li ......................... | G06F 18/217 |
| 2020/0175095 | A1 * | 6/2020 | Morariu ................ | G06F 40/117 |
| 2021/0390700 | A1 * | 12/2021 | Lee ......................... | G06F 18/25 |
| 2022/0028563 | A1 * | 1/2022 | Klasson ................ | H04W 4/029 |
| 2022/0156992 | A1 * | 5/2022 | Harikumar ................ | G06T 7/11 |
| 2024/0275996 | A1 * | 8/2024 | Debnath .............. | H04N 19/119 |

FOREIGN PATENT DOCUMENTS

| | | |
|---|---|---|
| CN | 108230329 A | 6/2018 |
| CN | 109033321 A | 12/2018 |
| CN | 109948707 A | 6/2019 |
| CN | 110390289 A | 10/2019 |
| CN | 110533676 A | 12/2019 |
| CN | 110555337 A | 12/2019 |
| CN | 110765916 A | 2/2020 |
| CN | 110782462 A | 2/2020 |
| CN | 110929696 A | 3/2020 |
| CN | 110930419 A | 3/2020 |
| CN | 111104962 A | 5/2020 |
| CN | 111126451 A | 5/2020 |
| CN | 111275721 A | 6/2020 |
| CN | 111667483 A | 9/2020 |
| CN | 111723841 A | 9/2020 |
| CN | 112184738 A | 1/2021 |

OTHER PUBLICATIONS

Office action received from Japanese patent application No. 2023-525962 mailed on Feb. 25, 2025, 5 pages (2 pages English Translation and 3 pages Original Copy).

International Search Report issued Dec. 30, 2021 in International Application No. PCT/CN2021/120815, with English translation (6 pages).

First Office Action issued Jun. 2, 2022 in CN Appl. No. 202011197790.9, English Translation (15 pages).

Jing. Ya et al. "Locate then Segment: A Strong Pipeline for Referring Image Segmentation" Mar. 30, 2021 (Mar. 30, 2021), pp. 1-10.

Hu, Ronghang et al. "Segmentation from Natural Language Expressions" Mar. 20, 2016 (Mar. 20, 2016), pp. 1-25.

Luo, Gen et al. "Multi-task Collaborative Network for Joint Referring Expression Comprehension and Segmentation" 2020 IEEEICVF Conference on Computer Vision and Pattern Recognition (CVPR), Aug. 5, 2020 (Aug. 5, 2020), pp. 10031-10040.

Wang. Fei et al. "Residual Attention Network for Image Classification" 2017 IEEE Conference on Computer Vision and Pattern Recognition (CVPR), Nov. 9, 2017 (Nov. 9, 2017), pp. 6450-6458.

Chen, L., et al. "DeepLab: Semantic Image Segmentation with Deep Convolutional Nets, Atrous Convolution, and Fully Connected CRFs" IEEE Transactions on Pattern Analysis and Machine Intelligence, Jun. 2016 (14 pages).

* cited by examiner

IMAGE SEGMENTATION METHOD FOR A TARGET OBJECT, DEVICE, AND STORAGE MEDIUM

CROSS-REFERENCES TO RELATED APPLICATIONS

This application is a national stage application filed under 35 U.S.C. 371 based on International Patent Application No. PCT/CN2021/120815, filed on Sep. 27, 2021, which claims priority to Chinese Patent Application No. 202011197790.9 filed with the China National Intellectual Property Administration (CNIPA) on Oct. 30, 2020, the disclosures of which are incorporated herein by reference in their entireties.

TECHNICAL FIELD

The present disclosure relates to the technical field of image processing, for example, an image segmentation method and apparatus, a device, and a storage medium.

BACKGROUND

Image segmentation under a language indication is a very important technique in cross-modal learning and is also referred to as referring image segmentation. The image segmentation under the language indication aims to segment a language-specified object out of an image. The image segmentation under the language indication needs to eliminate a semantic gap between an image and a linguistic description and thus is more challenging.

SUMMARY

The present disclosure provides an image segmentation method and apparatus, a device, and a storage medium, which can effectively segment a specified object in an image under an indication of a description language.

The present disclosure provides an image segmentation method including the steps described below.

A visual feature corresponding to an original image is fused with a text feature corresponding to a description language so that a multimodal feature is obtained, where the description language is used for specifying a target object to be segmented in the original image.

A visual region of the target object is determined according to an image corresponding to the multimodal feature and an image corresponding to the visual region is recorded as a response heat map.

A segmentation result of the target object is determined according to the image corresponding to the multimodal feature and the response heat map.

The present disclosure further provides an image segmentation apparatus including a fusion module, a visual region determination module, and a segmentation result determination module.

The fusion module is configured to fuse a visual feature corresponding to an original image with a text feature corresponding to a description language to obtain a multimodal feature, where the description language is used for specifying a target object to be segmented in the original image.

The visual region determination module is configured to determine a visual region of the target object according to an image corresponding to the multimodal feature and record an image corresponding to the visual region as a response heat map.

The segmentation result determination module is configured to determine a segmentation result of the target object according to the image corresponding to the multimodal feature and the response heat map.

The present disclosure further provides an electronic device. The electronic device includes one or more processors and a memory.

The memory is configured to store one or more program.

The one or more programs, when executed by the one or more processors, cause the one or more processors to perform the preceding image segmentation method.

The present disclosure further provides a computer-readable storage medium, which is configured to store a computer program which, when executed by a processor, causes the processor to perform the preceding image segmentation method.

DETAILED DESCRIPTION

Embodiments of the present disclosure are described hereinafter with reference to the drawings. The drawings illustrate some embodiments of the present disclosure, but the present disclosure may be implemented in various forms and is not limited to the embodiments set forth herein. These embodiments are provided for understanding the present disclosure more thoroughly and completely.

Steps described in method embodiments of the present disclosure may be performed in sequence and/or in parallel. Additionally, the method embodiments may include additional steps and/or omit the steps shown. The scope of the present disclosure is not limited in this respect.

The term "includes" or its variant used herein means "includes, but is not limited to". The term "based on" means "at least partially based on". The term "an embodiment" means "at least one embodiment". The term "another embodiment" means "at least one other embodiment". The term "some embodiments" means "at least some embodiments". Related definitions of other terms are given in the description hereinafter.

Concepts such as "first" and "second" in the present disclosure are intended to distinguish between different apparatuses, modules, units, or operations and are not intended to limit the order of or interdependence between functions implemented by these apparatuses, modules, units, or operations.

"One" or "multiple" in the present disclosure is illustrative and non-limiting and is interpreted as "one or more" unless otherwise specified in the context.

The names of messages or information exchanged between apparatuses in embodiments of the present disclosure are illustrative and not to limit the scope of the messages or information.

Embodiment One

Figure 1:
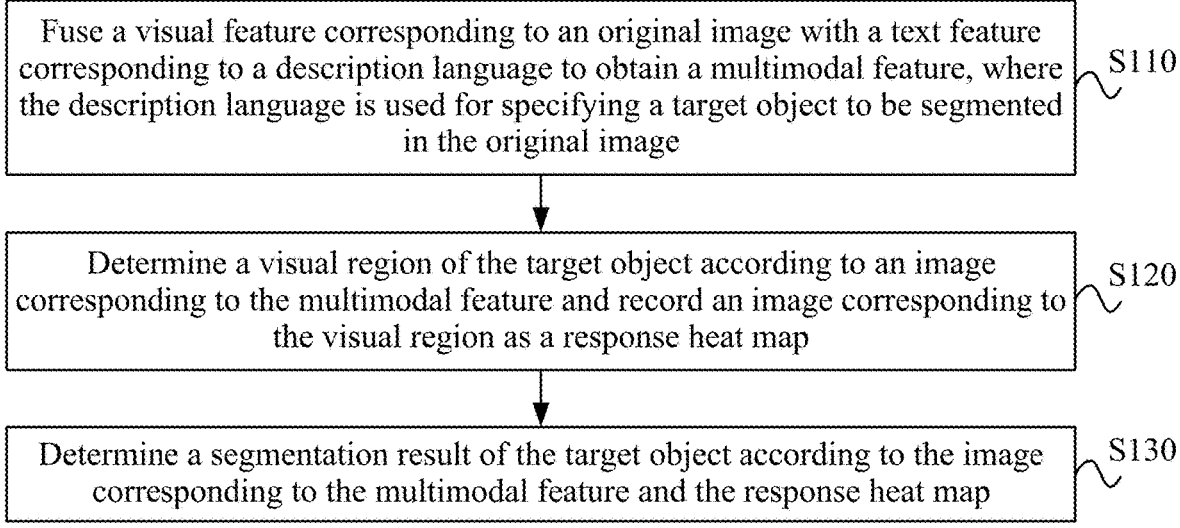
FIG. 1 is a flowchart of an image segmentation method according to embodiment one of the present disclosure.

FIG. 1 is a flowchart of an image segmentation method according to embodiment one of the present disclosure. The embodiment is applicable to the case where an object is segmented out of an image under a language indication, is applicable to fields such as image editing during interaction or human-computer interaction, and is also applicable to fields such as language-driven image object detection or language-driven image understanding. The method may be performed by an image segmentation apparatus. The apparatus may be implemented by software and/or hardware and may be configured in an electronic device. The electronic device may be a terminal having an image data processing function, for example, a mobile terminal such as a mobile phone, a tablet, or a notebook, a fixed terminal such as a desktop computer, or a server. As shown in FIG. 1, the method includes the steps described below.

In S110, a visual feature corresponding to an original image is fused with a text feature corresponding to a description language so that a multimodal feature is obtained, where the description language is used for specifying a target object to be segmented in the original image.

The original image may be an image including at least one object and may be acquired by a camera, a scanner, or in other manners or may be selected from an existing image library. The visual feature may be an image feature corresponding to the original image under a set resolution.

The visual feature is actually an image and a size of the resolution is not limited in the embodiment. In an example, the image feature of the original image under the set resolution may be extracted by a visual feature extraction network so that a corresponding visual feature image is obtained. The visual feature extraction network may employ the Darknet network structure or another network structure that can be used for extracting the visual feature. The Darknet is an open-source deep learning framework, which is simple in structure and free of dependency and has higher flexibility when used for extracting visual features.

The description language may be a text corresponding to a referring linguistic description and is used for specifying the target object to be segmented in the original image. The description language may include image information, position information of the target object, appearance information of the target object, and the like. The image information is used for determining information about an image to be segmented and may include, for example, information for uniquely identifying the image, such as a name of the image or a number of the image. The position information is used for preliminarily determining a position of the target object in the original image. The appearance information is used for determining the final target object. For example, the description language may be a user holding a badminton racket and dressed in red in image A. The text feature may be a feature that reflects a meaning of the description language and may generally be represented in the form of a vector. Optionally, the text feature of the description language may be extracted by a text feature extraction network. A structure of the text feature extraction network is not limited in the embodiment. For example, a gated recurrent unit (GRU) network, one recurrent neural network, may be used.

The multimodal feature is a fused feature obtained through the fusion of features in multiple modals. In the embodiment, the visual feature and the text feature are fused so that the multimodal feature is obtained, implementing a cross-modal feature representation and eliminating a semantic gap between the image and the description language. Optionally, cross product of data at positions corresponding to the visual feature and the text feature may be calculated so that the fused feature of the visual feature and the text feature, that is, the multimodal feature, is obtained. Actually, the multimodal feature is also an image. The multimodal feature may also be referred to as a multimodal feature image or an image corresponding to the multimodal feature, that is, an image including the multimodal feature.

In S120, a visual region of the target object is determined according to the image corresponding to the multimodal feature and an image corresponding to the visual region is recorded as a response heat map.

The visual region is a region where the target object is located. For example, when the target object is a pizza, the visual region is a region where the pizza is located. In the embodiment, when the target object is segmented, the visual region of the target object is first determined and the target object is segmented based on the visual region so that the complexity of image segmentation can be effectively reduced. Optionally, the image corresponding to the multimodal feature may be filtered so that interference of a non-target object with the target object is eliminated and the visual region of the target object is obtained. In the embodiment, the filtered image, that is, the image corresponding to the visual region, is recorded as the response heat map showing the position information of the target object. Each region corresponds to one response value. The larger the response value, the greater the probability that the target object exists in the region. Optionally, a region with a response value greater than a set threshold may be used as the visual region of the target object and highlighted. A size of the set threshold is not limited in the embodiment.

In S130, a segmentation result of the target object is determined according to the image corresponding to the multimodal feature and the response heat map.

Optionally, the segmentation result may be determined by an image segmentation model in conjunction with the image corresponding to the multimodal feature and the response heat map. The image segmentation model is used for determining the segmentation result of the target object. A structure of the model may be set as needed. For example, the model may include a convolutional layer and an upsampling layer, the convolutional layer is used for performing a convolution operation on an input image, and the upsampling layer is used for upsampling a convolution result to obtain the segmentation result. An image corresponding to the segmentation result has the same size as an actual segmentation result in the original image. The image segmentation model in the embodiment uses the image corresponding to the multimodal feature and the response heat map as input. Before application, the image corresponding to the multimodal feature and the response heat map may be inputted into the image segmentation model so that the image segmentation model is trained so as to adjust a parameter of the convolutional layer and a parameter of the upsampling layer. Optionally, a loss value of the segmentation result outputted from the image segmentation model relative to the actual segmentation result corresponding to the original image is determined. When the loss value is less than a set threshold, the training ends and a model corresponding to the loss value less than the set threshold is used as the image segmentation model for segmenting the target object in the embodiment.

Embodiment one of the present disclosure provides the image segmentation method in which the visual feature corresponding to the original image is fused with the text feature corresponding to the description language so that the multimodal feature is obtained, where the description language is used for specifying the target object to be segmented in the original image; the visual region of the target object is determined according to the image corresponding to the multimodal feature and the image corresponding to the visual region is recorded as the response heat map; and the segmentation result of the target object is determined according to the image corresponding to the multimodal feature and the response heat map. The method decomposes an image segmentation process, where the visual region of the target object is determined based on the image corresponding to the multimodal feature obtained through fusion so that the response heat map is obtained, and then the segmentation result is determined according to the image corresponding to the multimodal feature and the response heat map, thereby effectively eliminating the semantic gap between the image and the description language and segmenting the target object specified by the description language.

Embodiment Two

Figure 2:
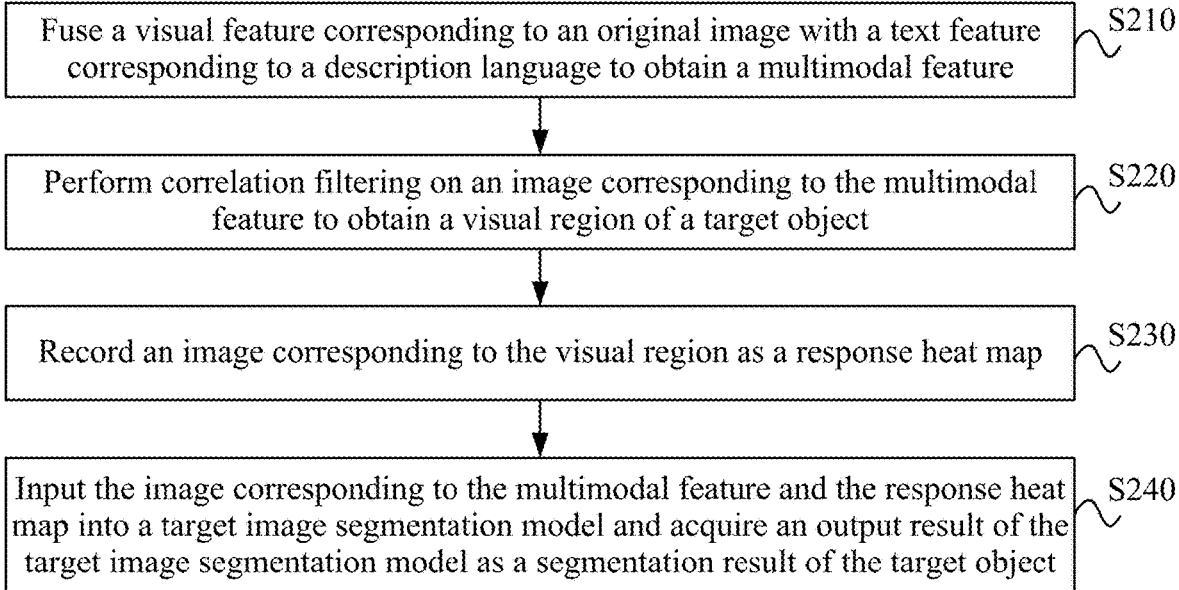
FIG. 2 is a flowchart of an image segmentation method according to embodiment two of the present disclosure.

FIG. 2 is a flowchart of an image segmentation method according to embodiment two of the present disclosure. The embodiment is described based on the preceding embodiment. Referring to FIG. 2, the method may include the steps described below.

In S210, a visual feature corresponding to an original image is fused with a text feature corresponding to a description language so that a multimodal feature is obtained.

One or more visual features may be obtained. To improve the accuracy of a segmentation result, the visual feature may include visual features extracted from the original image under at least two resolutions separately. Too few visual features will affect the accuracy of the segmentation result and too many visual features will increase the amount of computation. In the embodiment, three visual features are used as an example, which can reduce the amount of computation while improving the accuracy of the segmentation result. The visual features in the embodiment may include a first visual feature $$F_{v1} \in R^{\frac{H}{32} \times \frac{W}{32} \times d_1}$$

extracted from the original image ($R^{H \times F \times 3}$) under a first resolution, a second visual feature $$F_{v2} \in R^{\frac{H}{16} \times \frac{W}{16} \times d_2}$$

extracted from the original image under a second resolution, and a third visual feature $$F_{v3} \in R^{\frac{H}{8} \times \frac{W}{8} \times d_3}$$

extracted from the original image under a third resolution, where the first resolution<the second resolution<the third resolution. Values of the first resolution, the second resolution, and the third resolution may be set according to situations. In the embodiment, for example, the first resolution is $1/32$ of a resolution of the original image, the second resolution is $1/16$ of the resolution of the original image, and the third resolution is $1/8$ of the resolution of the original image. H and W denote a length and a width of the original image, respectively, and $d_i$ denotes a dimension of an image corresponding to a visual feature. In the embodiment, i=1, 2, 3.

In an example, the multimodal feature may be obtained in the manner described below.

At least two visual features are sorted in an order of sizes of the resolutions so that a sorting result is obtained. The text feature is mapped, through a mapping matrix, to a feature space where the first visual feature corresponding to the first resolution in the sorting result is located, where the first resolution has a smallest value. The first visual feature is spliced with the mapped text feature so that a first spliced feature is obtained. The first spliced feature is upsampled, the upsampled first spliced feature is spliced with the second visual feature corresponding to the second resolution in the sorting result so that a second spliced feature is obtained, and upsampling and splicing operations are cyclically performed until an upsampled spliced feature is spliced with a visual feature having a largest resolution in the sorting result so that the multimodal feature is obtained. The second resolution is greater than the first resolution and a smallest resolution except the first resolution.

Considering that the text feature and the visual feature have different lengths, to ensure a fusion effect, the text feature and the visual feature may be firstly mapped to the same feature space. For example, the visual feature may be mapped to a space where the text feature is located, or the text feature may be mapped to a space where the visual feature is located, or the text feature and the visual feature may be mapped to another feature space. In the embodiment, for example, the text feature is mapped to the feature space where the visual feature is located, which can simplify a mapping process and reduce the amount of computation.

When multiple visual features exist, the multiple visual features correspond to different resolutions and different image sizes. To ensure the effectiveness of splicing, in the embodiment, the multiple visual features are sorted in an ascending order of the resolutions of the multiple visual features so that a sorting result is obtained. The features are spliced in the ascending order of the resolutions of the visual features in the sorting result. That is, the visual feature with the smallest resolution is spliced with the text feature and then a splicing result is upsampled and spliced with the visual feature corresponding to the next resolution in the sorting result until the visual feature with the largest resolution is spliced.

For example, three visual features are included, which are the first visual feature, the second visual feature, and the third visual feature, separately. The first visual feature, the second visual feature, and the third visual feature correspond to the first resolution, the second resolution, and the third resolution, respectively, where the first resolution<the second resolution<the third resolution. The cross product of values at positions corresponding to the first visual feature and the mapped text feature may be calculated so that the first visual feature is spliced with the mapped text feature and the first spliced feature is obtained. As described above, the resolution of the first visual feature<the resolution of the second visual feature<the resolution of the third visual feature, that is, the resolution of the first spliced feature is lower than the resolution of the second visual feature. To splice features under the same resolution, the first spliced feature is upsampled in the embodiment so that the resolution of the upsampled spliced feature is the same as the resolution of the second visual feature. Then, the second visual feature is spliced with the upsampled first spliced feature through a splicing operation for the first spliced feature so that the second spliced feature is obtained. The second spliced feature is upsampled and the upsampled second spliced feature is spliced with the third visual feature so that a third spliced feature, that is, the multimodal feature, is obtained. In the embodiment, the visual feature and the text feature are fused so that a cross-modal feature representation is implemented and the accuracy of the segmentation result can be improved when a target object is subsequently segmented.

In S220, correlation filtering is performed on an image corresponding to the multimodal feature so that a visual region of the target object is obtained.

In an example, a convolution kernel may be generated according to the text feature and a convolution operation is performed on the image corresponding to the multimodal feature according to the convolution kernel so that the correlation filtering is performed on a multimodal feature image and a response value corresponding to each region is obtained. A larger response value of a region means a greater probability that the target object exists in the region. The corresponding visual region may be obtained according to the response value.

In S230, an image corresponding to the visual region is recorded as a response heat map.

In S240, the image corresponding to the multimodal feature and the response heat map are inputted into a target image segmentation model and an output result of the target image segmentation model is acquired as the segmentation result of the target object.

Figure 3:
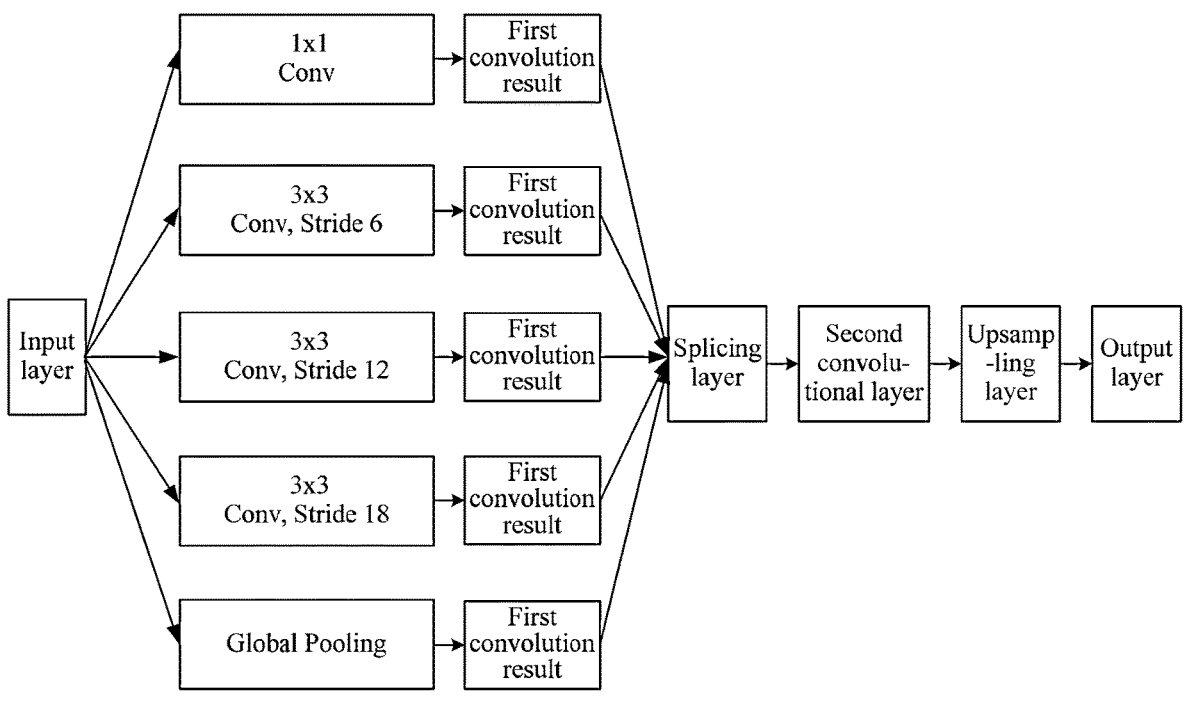
FIG. 3 is a structural diagram of an image segmentation model according to embodiment two of the present disclosure.

In the embodiment, an initial image segmentation model is designed according to the visual region, so as to obtain a more accurate segmentation result. For example, referring to FIG. 3 which is a structural diagram of an initial image segmentation model according to embodiment two of the present disclosure, the image segmentation model includes an input layer, parallel first convolutional layers, a splicing layer, a second convolutional layer, an upsampling layer, and an output layer. The number of the first convolutional layers may be set according to situations. In FIG. 3, five first convolutional layers are used as an example so that contents of an image on different scales can be better captured. Each first convolutional layer corresponds to one sampling rate, that is, a first convolution operation is performed on an input image at five different sampling rates separately so that five convolution results are obtained. The splicing layer is used for splicing the five convolution results. The second convolutional layer is used for performing another convolution operation on a spliced result. The upsampling layer is used for ensuring that the resolution of the segmentation result outputted from the image segmentation model is consistent with the resolution of an actual segmentation result of the original image.

Before the image segmentation model is applied, parameters of the first convolutional layers, the splicing layer, the second convolutional layer, and the upsampling layer in the initial image segmentation model may be trained so that the target image segmentation model is obtained. A training process is described below.

A sample image and a sample description language are acquired and a sample visual feature of the sample image and a sample text feature of the sample description language are extracted; the sample visual feature is fused with the sample text feature so that a sample multimodal feature is obtained; a sample visual region of a sample target object is determined according to an image corresponding to the sample multimodal feature and an image corresponding to the sample visual region is recorded as a sample response heat map; and the initial image segmentation model is trained according to the image corresponding to the sample multimodal feature and the sample response heat map so that the target image segmentation model is obtained.

The number of sample images and the number of sample description languages are not limited in the embodiment. To improve the accuracy of the image segmentation model, multiple sample images and multiple sample description languages may be selected; sample visual features of the sample images and sample text features of the sample description languages are extracted and spliced so that sample multimodal features are obtained; the correlation filtering is performed on the multimodal features so that sample response heat maps are obtained; and the initial image segmentation model may be trained according to images corresponding to the sample multimodal features and the sample response heat maps so that the target image segmentation model is obtained. For feature extraction, splicing, and filtering processes, reference may be made to the preceding embodiments. The details are not repeated here.

According to the structure shown in FIG. 3, the image corresponding to the sample multimodal feature and the sample response heat map may be inputted into the initial image segmentation model so that multiple first convolution results of the image corresponding to the sample multimodal feature and the sample response heat map are obtained; the multiple first convolution results are spliced so that a spliced result is obtained; a second convolution operation is performed on the spliced result so that a second convolution result is obtained; the second convolution result is upsampled so that a sample segmentation result is obtained; a loss value of the sample segmentation result relative to an actual segmentation result of the sample image is determined; in the case where the loss value is less than a set threshold, the initial image segmentation model stops being trained and an image segmentation model with the loss value less than the set threshold is used as the target image segmentation model; and in the case where the loss value is not less than the set threshold, the initial image segmentation model continues to be trained until the loss value is less than the set threshold. Optionally, the loss value of the sample segmentation result relative to the actual segmentation result of the sample image may be determined by the following loss function:

$$L = \sum_{l=1}^{\frac{H}{4} \times \frac{W}{4}} [y_l \log(p_l) + (1 - y_l)\log(1 - p_l)].$$

L denotes the loss value of the sample segmentation result relative to the actual segmentation result of the sample image, $y_l$ denotes an element value of each region in the actual segmentation result of the original image after down-sampling, and $p_l$ denotes an element value of each region in the sample segmentation result. A size of the set threshold may be set according to situations and may be, for example, 0.5. That is, when L<0.5, the training ends.

Figure 4:
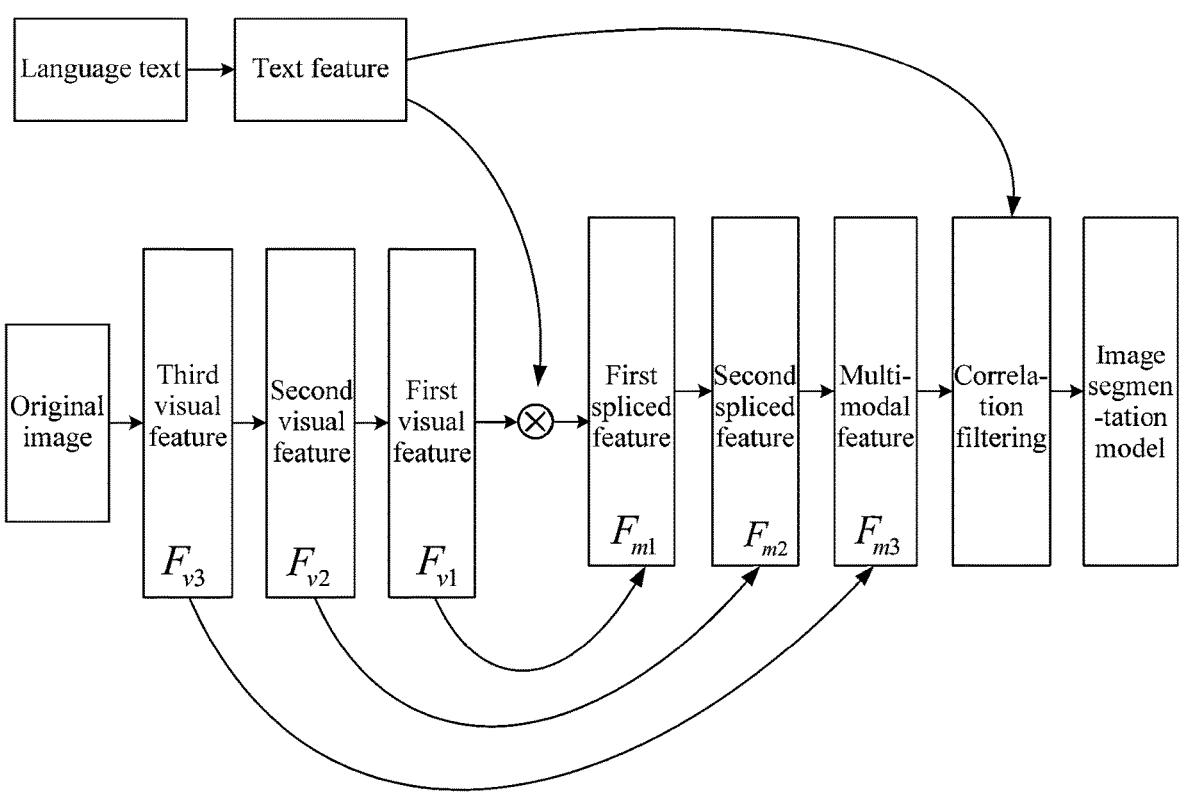
FIG. 4 is an implementation flowchart of an image segmentation method according to embodiment two of the present disclosure.

For example, referring to FIG. 4 which is an implementation flowchart of an image segmentation method according to embodiment two of the present disclosure, the original image and the description language are acquired and then the visual features of the original image at different levels and the text feature corresponding to the description language are extracted. In FIG. 4, three levels are used as an example, which correspond to three resolutions separately. The first visual feature $F_{v1}$ is spliced with the mapped text feature so that the first spliced feature $F_{m1}$ is obtained, the first spliced feature $F_{m1}$ is upsampled and spliced with the second visual feature $F_{v2}$ so that the second spliced feature $F_{m2}$ is obtained, and the second spliced feature $F_{m2}$ is upsampled and spliced with the third visual feature $F_{v3}$ so that the third spliced feature $F_{m3}$, that is, the multimodal feature, is obtained. The correlation filtering is performed on the multimodal feature $F_{m3}$ so that the response heat map is obtained, and the response heat map and the image corresponding to the multimodal feature $F_{m3}$ are inputted into the target image segmentation model so that the segmentation result of the target object can be obtained, which is simple and effective.

Figure 5:
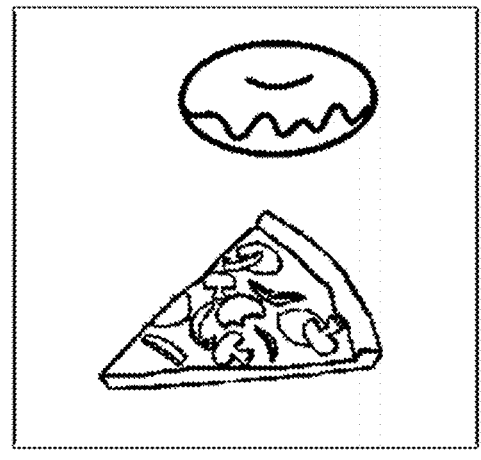
FIG. 5 is a schematic diagram of an original image according to embodiment two of the present disclosure.
Figure 6:
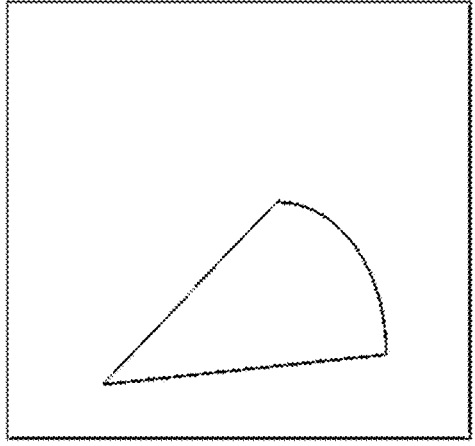
FIG. 6 is a schematic diagram of a segmentation result according to embodiment two of the present disclosure.
Figure 7:
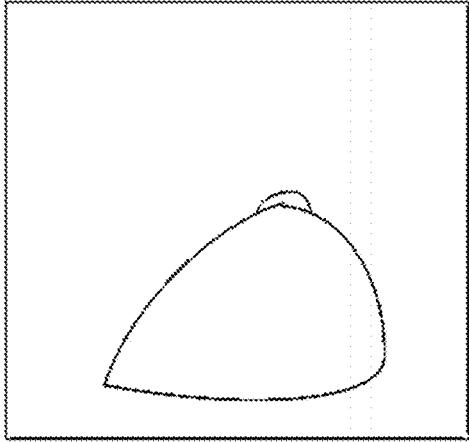
FIG. 7 is a schematic diagram of a segmentation result obtained by a traditional method.
Figure 8:
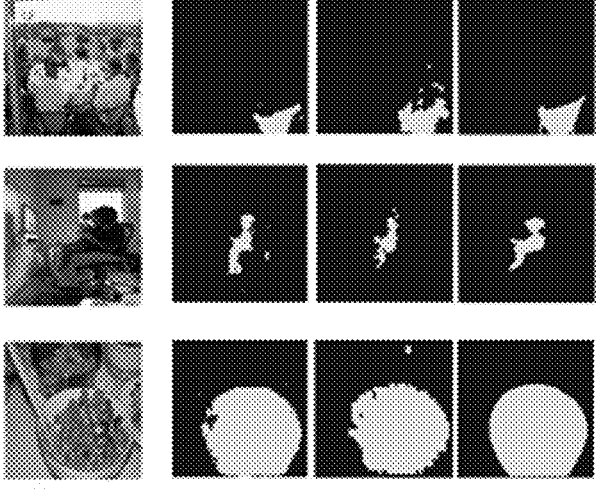
FIG. 8 is a schematic diagram illustrating the comparison of results of segmentation of the same image by using an image segmentation method in an embodiment of the present disclosure and by using the related art according to embodiment two of the present disclosure.

For example, referring to FIG. 5 which is a schematic diagram of an original image according to embodiment two of the present disclosure, it is assumed that a language text is "Pizza Nearest", that is, a pizza with a shortest distance is segmented. The segmentation result shown in FIG. 6 can be obtained by the image segmentation method provided in the preceding embodiment. The segmentation result obtained by a traditional method is shown in FIG. 7. For example, referring to FIG. 8 which is a schematic diagram illustrating the comparison of results of segmentation of the same image by using an image segmentation method in an embodiment of the present disclosure and by using the related art according to embodiment two of the present disclosure, three original images are in the first column separately, objects segmented by the method provided in the embodiment of the present disclosure are in the second column separately, and objects segmented by using the related art are in the third column and the fourth column separately. As can be seen from FIGS. 6 and 8, the objects segmented by the image segmentation method according to the embodiment of the present disclosure more approximates to their actual results, improving the accuracy of an image segmentation result.

Embodiment two of the present disclosure provides the image segmentation method. Based on the preceding embodiment, an image segmentation process is decomposed, where the visual region of the target object is preliminarily determined and then the initial image segmentation model is constructed, simplifying the complexity of the initial image segmentation model; the initial image segmentation model is trained by using the multimodal feature image and the response heat map so that the target image segmentation model is obtained, and the segmentation result is obtained by using the target image segmentation model, thereby effectively eliminating a semantic gap between the image and the description language and improving the accuracy of the segmentation result to some extent.

Embodiment Three

Figure 9:
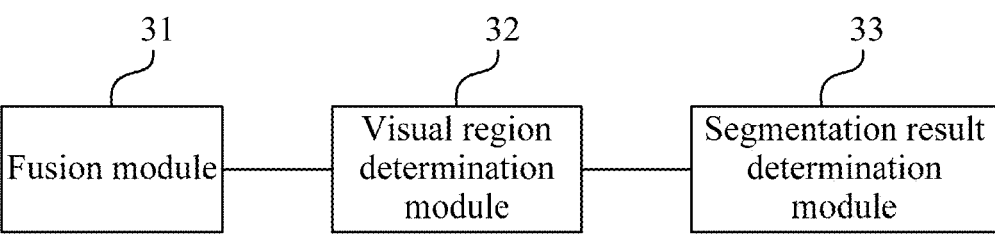
FIG. 9 is a structural diagram of an image segmentation apparatus according to embodiment three of the present disclosure.

FIG. 9 is a structural diagram of an image segmentation apparatus according to embodiment three of the present disclosure. The apparatus may perform the image segmentation method according to the preceding embodiment and may be integrated in an electronic device. Referring to FIG. 9, the apparatus may include a fusion module 31, a visual region determination module 32, and a segmentation result determination module 33.

The fusion module 31 is configured to fuse a visual feature corresponding to an original image with a text feature corresponding to a description language to obtain a multimodal feature, where the description language is used for specifying a target object to be segmented in the original image. The visual region determination module 32 is configured to determine a visual region of the target object according to an image corresponding to the multimodal feature and record an image corresponding to the visual region as a response heat map. The segmentation result determination module 33 is configured to determine a segmentation result of the target object according to the image corresponding to the multimodal feature and the response heat map.

The embodiment of the present disclosure provides the image segmentation apparatus, where the visual feature corresponding to the original image is fused with the text feature corresponding to the description language so that the multimodal feature is obtained, where the description language is used for specifying the target object to be segmented in the original image; the visual region of the target object is determined according to the image corresponding to the multimodal feature and the image corresponding to the visual region is recorded as the response heat map; and the segmentation result of the target object is determined according to the image corresponding to the multimodal feature and the response heat map. The apparatus decomposes an image segmentation process, where the visual region of the target object is determined based on the image corresponding to the multimodal feature obtained through fusion so that the response heat map is obtained, and then the segmentation result is determined according to the image corresponding to the multimodal feature and the response heat map, thereby effectively eliminating a semantic gap between the image and the description language and segmenting the target object specified by the description language.

Based on the preceding embodiment, the visual region determination module 32 includes a filtering unit.

The filtering unit is configured to perform correlation filtering on the image corresponding to the multimodal feature to obtain the visual region of the target object.

Based on the preceding embodiment, the filtering unit is configured to determine a convolution kernel according to the text feature and perform a convolution operation on the image corresponding to the multimodal feature according to the convolution kernel to obtain the visual region of the target object.

Based on the preceding embodiment, the visual feature includes visual features extracted from the original image under at least two resolutions separately.

Based on the preceding embodiment, the fusion module 31 is configured to sort at least two visual features in an order of sizes of the resolutions to obtain a sorting result; and map, through a mapping matrix, the text feature to a feature space where a first visual feature corresponding to a first resolution in the sorting result is located, where the first resolution has a smallest value; splice the first visual feature with the mapped text feature to obtain a first spliced feature; and upsample the first spliced feature, splice the upsampled first spliced feature with a second visual feature corresponding to a second resolution in the sorting result to obtain a second spliced feature, and cyclically perform upsampling and splicing operations until an upsampled spliced feature is spliced with a visual feature having a largest resolution in the sorting result to obtain the multimodal feature. The second resolution is greater than the first resolution and a smallest resolution except the first resolution.

Based on the preceding embodiment, the segmentation result determination module 33 is configured to input the image corresponding to the multimodal feature and the response heat map into a target image segmentation model and acquire an output result of the target image segmentation model as the segmentation result of the target object.

Based on the preceding embodiment, a training process of the target image segmentation model is described below.

A sample image and a sample description language are acquired and a sample visual feature of the sample image and a sample text feature of the sample description language are extracted, where the sample description language is used for specifying a sample target object to be segmented in the sample image; the sample visual feature is fused with the sample text feature so that a sample multimodal feature is obtained; a sample visual region of the sample target object is determined according to an image corresponding to the sample multimodal feature and an image corresponding to the sample visual region is recorded as a sample response heat map; and an initial image segmentation model is trained according to the image corresponding to the sample multimodal feature and the sample response heat map so that the target image segmentation model is obtained.

Based on the preceding embodiment, that the initial image segmentation model is trained according to the image corresponding to the sample multimodal feature and the sample response heat map so that the target image segmentation model is obtained includes the following.

The image corresponding to the sample multimodal feature and the sample response heat map are inputted into the initial image segmentation model so that multiple first convolution results of the image corresponding to the sample multimodal feature and the sample response heat map are obtained, where the multiple first convolution results are obtained through a first convolution operation performed on the image corresponding to the sample multimodal feature and the sample response heat map at different sampling rates. The multiple first convolution results are spliced so that a spliced result is obtained. A second convolution operation is performed on the spliced result so that a second convolution result is obtained. The second convolution result is upsampled so that a sample segmentation result is obtained. A loss value of the sample segmentation result relative to an actual segmentation result of the sample image is determined. In the case were the loss value is less than a set threshold, the initial image segmentation model stops being trained and an image segmentation model with the loss value less than the set threshold is used as the target image segmentation model. In the case where the loss value is not less than the set threshold, the initial image segmentation model continues to be trained until the loss value is less than the set threshold.

The image segmentation apparatus provided in the embodiment of the present disclosure belongs to the same concept as the image segmentation method provided in the preceding embodiments. For technical details not described in detail in the embodiment, reference may be made to the preceding embodiments, and the embodiment has the same effects as the image segmentation method performed.

Embodiment Four

Figure 10:
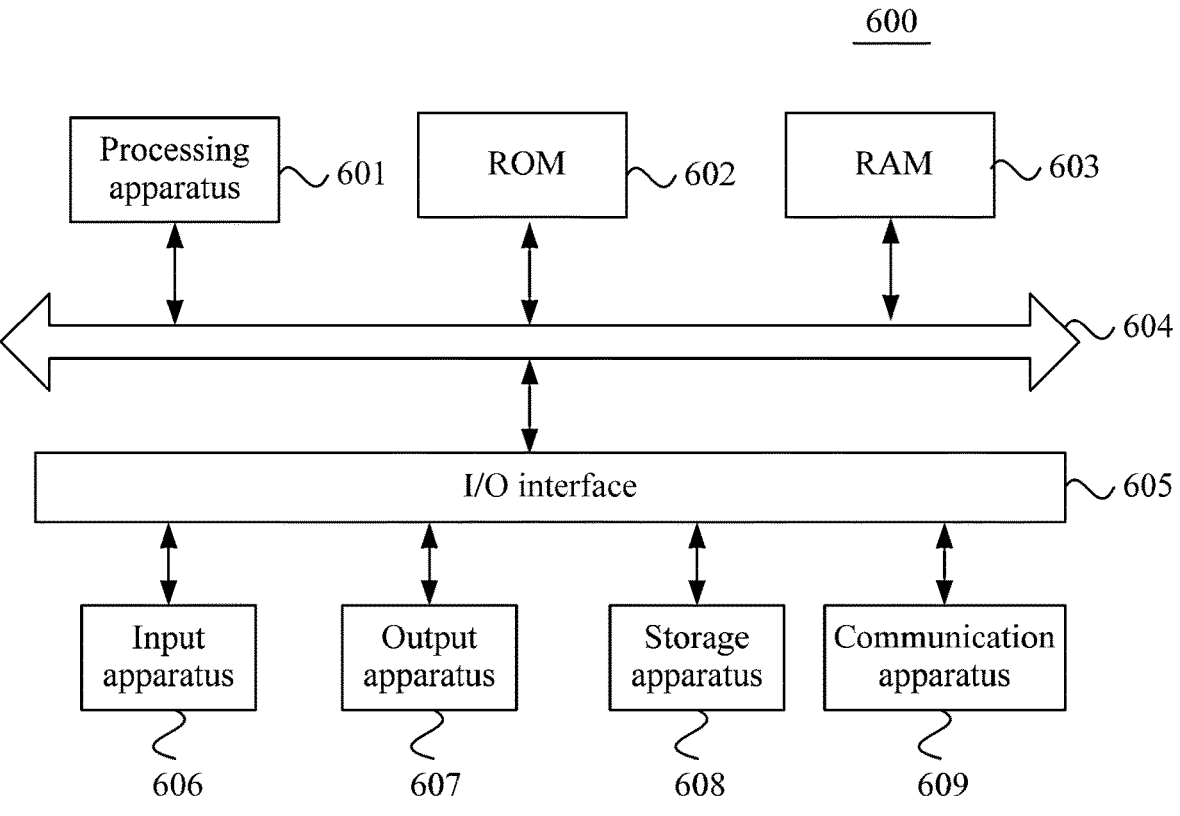
FIG. 10 is a structural diagram of an electronic device according to embodiment four of the present disclosure.

Referring to FIG. 10, FIG. 10 is a structural diagram of an electronic device 600 suitable for implementing embodiments of the present disclosure. The electronic device in the embodiment of the present disclosure may include, but is not limited to, a mobile terminal such as a mobile phone, a laptop, a digital broadcast receiver, a personal digital assistant (PDA), a portable Android device (PAD), a portable media player (PMP), or an in-vehicle terminal (such as an in-vehicle navigation terminal) or a stationary terminal such as a digital television (TV), a desktop computer, or a server. The electronic device shown in FIG. 10 is an example and is not intended to limit the function and use range of the embodiment of the present disclosure.

As shown in FIG. 10, the electronic device 600 may include a processing apparatus 601 (such as a central processing unit or a graphics processing unit). The processing apparatus 601 may perform various types of appropriate operations and processing according to a program stored in a read-only memory (ROM) 602 or a program loaded from a storage apparatus 608 to a random-access memory (RAM) 603. The RAM 603 also stores various programs and data required for the operation of the electronic device 600. The processing apparatus 601, the ROM 602, and the RAM 603 are connected to each other through a bus 604. An input/output (I/O) interface 605 is also connected to the bus 604.

Generally, the following apparatuses may be connected to the I/O interface 605: an input apparatus 606 such as a touch screen, a touchpad, a keyboard, a mouse, a camera, a microphone, an accelerometer, or a gyroscope; an output apparatus 607 such as a liquid crystal display (LCD), a speaker, or a vibrator; the storage apparatus 608 such as a magnetic tape or a hard disk; and a communication apparatus 609. The communication apparatus 609 may allow the electronic device 600 to perform wireless or wired communication with other devices to exchange data. Although FIG. 10 shows the electronic device 600 having various apparatuses, it is not required to implement or include all the apparatuses shown. Alternatively, more or fewer apparatuses may be implemented or present.

According to an embodiment of the present disclosure, the process described above with reference to flowcharts may be implemented as a computer software program. For example, a computer program product is included in the embodiment of the present disclosure. The computer program product includes a computer program carried on a non-transitory computer-readable medium. The computer program includes program codes for executing the methods shown in the flowcharts. In such embodiments, the computer program may be downloaded and installed from a network through the communication apparatus 609, installed from the storage apparatus 608, or installed from the ROM 602. When the computer program is executed by the processing apparatus 601, the preceding functions defined in the methods in embodiments of the present disclosure are implemented.

Embodiment Five

The preceding computer-readable medium of the present disclosure may be a computer-readable signal medium or a computer-readable storage medium or any combination thereof. For example, the computer-readable storage medium may be, but is not limited to, an electrical, magnetic, optical, electromagnetic, infrared, or semiconductor system, apparatus, or device or any combination thereof. Examples of the computer-readable storage medium may include, but are not limited to, an electrical connection having one or more wires, a portable computer disk, a hard disk, a RAM, a ROM, an erasable programmable read-only memory (EPROM), a flash memory, an optical fiber, a portable compact disc read-only memory (CD-ROM), an optical memory device, a magnetic memory device, or any suitable combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as part of a carrier, where computer-readable program codes are carried in the data signal. The data signal propagated in this manner may be in multiple forms and includes, but is not limited to, an electromagnetic signal, an optical signal, or any suitable combination thereof. The computer-readable signal medium may also be any computer-readable medium except the computer-readable storage medium. The computer-readable signal medium may send, propagate, or transmit a program used by or used in conjunction with an instruction execution system, apparatus, or device. Program codes included on the computer-readable medium may be transmitted by any suitable medium, including, but not limited to, a wire, an optical cable, a radio frequency (RF), or any suitable combination thereof.

In some embodiments, clients and servers may communicate using any network protocol currently known or developed in the future, such as a Hypertext Transfer Protocol (HTTP), and may be interconnected via any form or medium of digital data communication (for example, a communication network). Examples of the communication network include a local area network (LAN), a wide area network (WAN), an inter-network (for example, the Internet), a peer-to-peer network (for example, an ad hoc network), and any network currently known or developed in the future.

The preceding computer-readable medium may be included in the preceding electronic device or may exist alone without being assembled into the electronic device.

The preceding computer-readable medium carries one or more programs, where the one or more programs, when executed by the electronic device, cause the electronic device to fuse a visual feature corresponding to an original image with a text feature corresponding to a description language to obtain a multimodal feature, where the description language is used for specifying a target object to be segmented in the original image; determine a visual region of the target object according to an image corresponding to the multimodal feature and record an image corresponding to the visual region as a response heat map; and determine a segmentation result of the target object according to the image corresponding to the multimodal feature and the response heat map.

Computer program codes for executing operations in the present disclosure may be written in one or more programming languages or a combination thereof. The preceding programming languages include, but are not limited to, an object-oriented programming language such as Java, Smalltalk, or C++ and may also include a conventional procedural programming language such as C or a similar programming language. Program codes may be executed entirely on a user computer, executed partly on a user computer, executed as a stand-alone software package, executed partly on a user computer and partly on a remote computer, or executed entirely on a remote computer or a server. In the case where the remote computer is involved, the remote computer may be connected to the user computer through any type of network including a LAN or a WAN or may be connected to an external computer (for example, through the Internet provided by an Internet service provider).

Flowcharts and block diagrams among the drawings illustrate architectures, functions, and operations possible to implement in accordance with the system, method, and computer program product in embodiments of the present disclosure. In this regard, each block in the flowcharts or block diagrams may represent a module, program segment, or part of codes, where the module, program segment, or part of codes includes one or more executable instructions for implementing specified logical functions. It is to be noted that in some alternative implementations, functions marked in blocks may occur in an order different from that marked in the drawings. For example, two successive blocks may, in fact, be executed substantially in parallel or in reverse order, which depends on the functions involved. It is also to be noted that each block in the block diagrams and/or flowcharts and a combination of blocks in the block diagrams and/or flowcharts may be implemented by a special-purpose hardware-based system executing a specified function or operation or may be implemented by a combination of special-purpose hardware and computer instructions.

The involved modules described in the embodiments of the present disclosure may be implemented by software or hardware. The name of a module is not intended to limit the module itself in one case. For example, a splicing module may also be described as "a module for splicing a visual feature corresponding to an original image with a text feature corresponding to a language text to obtain a multimodal feature".

The functions described above herein may be at least partially implemented by one or more hardware logic components. For example, without limitation, example types of hardware logic component that can be used include a field-programmable gate array (FPGA), an application-specific integrated circuit (ASIC), an application-specific standard product (ASSP), a system-on-chip (SoC), a complex programmable logic device (CPLD), and the like.

In the context of the present disclosure, a machine-readable medium may be a tangible medium that may include or store a program used by an instruction execution system, apparatus, or device or used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device or any suitable combination thereof. Examples of the machine-readable storage medium include an electrical connection based on one or more wires, a portable computer disk, a hard disk, a RAM, a ROM, an EPROM, a flash memory, an optical fiber, a CD-ROM, an optical storage device, a magnetic storage device, or any suitable combination thereof.

According to one or more embodiments of the present disclosure, the present disclosure provides an image segmentation method including the steps described below.

A visual feature corresponding to an original image is fused with a text feature corresponding to a description language so that a multimodal feature is obtained, where the description language is used for specifying a target object to be segmented in the original image. A visual region of the target object is determined according to an image corresponding to the multimodal feature and an image corresponding to the visual region is recorded as a response heat map. A segmentation result of the target object is determined according to the image corresponding to the multimodal feature and the response heat map.

According to one or more embodiments of the present disclosure, in the image segmentation method provided by the present disclosure, the step in which the visual region of the target object is determined according to the image corresponding to the multimodal feature includes the step described below.

Correlation filtering is performed on the image corresponding to the multimodal feature so that the visual region of the target object is obtained.

According to one or more embodiments of the present disclosure, in the image segmentation method provided by the present disclosure, the step in which the correlation filtering is performed on the image corresponding to the multimodal feature so that the visual region of the target object is obtained includes the steps described below.

A convolution kernel is determined according to the text feature. A convolution operation is performed on the image corresponding to the multimodal feature according to the convolution kernel so that the visual region of the target object is obtained.

According to one or more embodiments of the present disclosure, in the image segmentation method provided by the present disclosure, the visual feature includes visual features extracted from the original image under at least two resolutions separately.

According to one or more embodiments of the present disclosure, in the image segmentation method provided by the present disclosure, the step in which the visual feature corresponding to the original image is fused with the text feature corresponding to the description language so that the multimodal feature is obtained includes the steps described below.

At least two visual features are sorted in an order of sizes of the resolutions so that a sorting result is obtained. The text feature is mapped, through a mapping matrix, to a feature space where a first visual feature corresponding to a first resolution in the sorting result is located, where the first resolution has a smallest value. The first visual feature is spliced with the mapped text feature so that a first spliced feature is obtained. The first spliced feature is upsampled, the upsampled first spliced feature is spliced with a second visual feature corresponding to a second resolution in the sorting result so that a second spliced feature is obtained, and upsampling and splicing operations are cyclically performed until an upsampled spliced feature is spliced with a visual feature having a largest resolution in the sorting result so that the multimodal feature is obtained, where the second resolution is greater than the first resolution and a smallest resolution except the first resolution.

According to one or more embodiments of the present disclosure, in the image segmentation method provided by the present disclosure, the step in which the segmentation result of the target object is determined according to the image corresponding to the multimodal feature and the response heat map includes the steps described below.

The image corresponding to the multimodal feature and the response heat map are inputted into a target image segmentation model and an output result of the target image segmentation model is acquired as the segmentation result of the target object.

According to one or more embodiments of the present disclosure, in the image segmentation method provided by the present disclosure, a training process of the target image segmentation model is described below.

A sample image and a sample description language are acquired and a sample visual feature of the sample image and a sample text feature of the sample description language are extracted, where the sample description language is used for specifying a sample target object to be segmented in the sample image. The sample visual feature is fused with the sample text feature so that a sample multimodal feature is obtained. A sample visual region of the sample target object is determined according to an image corresponding to the sample multimodal feature and an image corresponding to the sample visual region is recorded as a sample response heat map. An initial image segmentation model is trained according to the image corresponding to the sample multimodal feature and the sample response heat map so that the target image segmentation model is obtained.

According to one or more embodiments of the present disclosure, in the image segmentation method provided by the present disclosure, the step in which the initial image segmentation model is trained according to the image corresponding to the sample multimodal feature and the sample response heat map so that the target image segmentation model is obtained includes the steps described below.

The image corresponding to the sample multimodal feature and the sample response heat map are inputted into the initial image segmentation model so that multiple first convolution results of the image corresponding to the sample multimodal feature and the sample response heat map are obtained, where the multiple first convolution results are obtained through a first convolution operation performed on the image corresponding to the sample multimodal feature and the sample response heat map at different sampling rates. The multiple first convolution results are spliced so that a spliced result is obtained. A second convolution operation is performed on the spliced result so that a second convolution result is obtained. The second convolution result is upsampled so that a sample segmentation result is obtained. A loss value of the sample segmentation result relative to an actual segmentation result of the sample image is determined. In the case where the loss value is less than a set threshold, the initial image segmentation model stops being trained and an image segmentation model with the loss value less than the set threshold is used as the target image segmentation model. In the case where the loss value is not less than the set threshold, the initial image segmentation model continues to be trained until the loss value is less than the set threshold.

According to one or more embodiments of the present disclosure, the present disclosure provides an image segmentation apparatus including a fusion module, a visual region determination module, and a segmentation result determination module.

The fusion module is configured to fuse a visual feature corresponding to an original image with a text feature corresponding to a description language to obtain a multimodal feature, where the description language is used for specifying a target object to be segmented in the original image.

The visual region determination module is configured to determine a visual region of the target object according to an image corresponding to the multimodal feature and record an image corresponding to the visual region as a response heat map. The segmentation result determination module is configured to determine a segmentation result of the target object according to the image corresponding to the multimodal feature and the response heat map.

According to one or more embodiments of the present disclosure, the present disclosure provides an electronic device.

The electronic device includes one or more processors and a memory configured to store one or more program; where the one or more programs, when executed by the one or more processors, cause the one or more processors to perform the image segmentation method provided in any embodiment of the present disclosure.

According to one or more embodiments of the present disclosure, the present disclosure provides a computer-readable storage medium, which is configured to store a computer program which, when executed by a processor, causes the processor to perform the image segmentation method provided in any embodiment of the present disclosure.

Additionally, although multiple operations are described in a particular order, it is not a must to perform these operations in this particular order or in sequential order. In a certain environment, multitasking and parallel processing may be advantageous. Similarly, although multiple implementation details are included in the preceding discussion, these should not be construed as limiting the scope of the present disclosure. Some features described in the context of separate embodiments may be implemented in combination in a single embodiment. Rather, features described in the context of a single embodiment may be implemented in multiple embodiments individually or in any suitable sub-combination.

What is claimed is:

1. An image segmentation method, comprising:
fusing a visual feature corresponding to an original image with a text feature corresponding to a description language to obtain a multimodal feature, wherein the description language is used for specifying a target object to be segmented in the original image;
determining a visual region of the target object according to an image corresponding to the multimodal feature and recording an image corresponding to the visual region as a response heat map; and
determining a segmentation result of the target object according to the image corresponding to the multimodal feature and the response heat map,
wherein determining the visual region of the target object according to the image corresponding to the multimodal feature comprises:
performing correlation filtering on the image corresponding to the multimodal feature to obtain the visual region of the target object.

2. The method of claim 1, wherein performing the correlation filtering on the image corresponding to the multimodal feature to obtain the visual region of the target object comprises:
determining a convolution kernel according to the text feature; and
performing a convolution operation on the image corresponding to the multimodal feature according to the convolution kernel to obtain the visual region of the target object.

3. The method of claim 2, wherein determining the segmentation result of the target object according to the image corresponding to the multimodal feature and the response heat map comprises:
inputting the image corresponding to the multimodal feature and the response heat map into a target image segmentation model and acquiring an output result of the target image segmentation model as the segmentation result of the target object.

4. The method of claim 1, wherein the visual feature comprises visual features extracted from the original image under at least two resolutions separately.

5. The method of claim 4, wherein fusing the visual feature corresponding to the original image with the text feature corresponding to the description language to obtain the multimodal feature comprises:
sorting at least two visual features in an order of sizes of the resolutions to obtain a sorting result; and mapping, through a mapping matrix, the text feature to a feature space where a first visual feature corresponding to a first resolution in the sorting result is located, wherein the first resolution has a smallest value;
splicing the first visual feature with the mapped text feature to obtain a first spliced feature; and
upsampling the first spliced feature, splicing the upsampled first spliced feature with a second visual feature corresponding to a second resolution in the sorting result to obtain a second spliced feature, and cyclically performing upsampling and splicing operations until an upsampled spliced feature is spliced with a visual feature having a largest resolution in the sorting result to obtain the multimodal feature, wherein the second resolution is greater than the first resolution and a smallest resolution except the first resolution.

6. The method of claim 5, wherein determining the segmentation result of the target object according to the image corresponding to the multimodal feature and the response heat map comprises:
inputting the image corresponding to the multimodal feature and the response heat map into a target image segmentation model and acquiring an output result of the target image segmentation model as the segmentation result of the target object.

7. The method of claim 4, wherein determining the segmentation result of the target object according to the image corresponding to the multimodal feature and the response heat map comprises:
inputting the image corresponding to the multimodal feature and the response heat map into a target image segmentation model and acquiring an output result of the target image segmentation model as the segmentation result of the target object.

8. The method of claim 1, wherein determining the segmentation result of the target object according to the image corresponding to the multimodal feature and the response heat map comprises:

inputting the image corresponding to the multimodal feature and the response heat map into a target image segmentation model and acquiring an output result of the target image segmentation model as the segmentation result of the target object.

9. The method of claim 8, wherein a training process of the target image segmentation model comprises:

acquiring a sample image and a sample description language and extracting a sample visual feature of the sample image and a sample text feature of the sample description language, wherein the sample description language is used for specifying a sample target object to be segmented in the sample image;

fusing the sample visual feature with the sample text feature to obtain a sample multimodal feature;

determining a sample visual region of the sample target object according to an image corresponding to the sample multimodal feature and recording an image corresponding to the sample visual region as a sample response heat map; and training an initial image segmentation model according to the image corresponding to the sample multimodal feature and the sample response heat map to obtain the target image segmentation model.

10. The method of claim 9, wherein training the initial image segmentation model according to the image corresponding to the sample multimodal feature and the sample response heat map to obtain the target image segmentation model comprises:

inputting the image corresponding to the sample multimodal feature and the sample response heat map into the initial image segmentation model to obtain a plurality of first convolution results of the image corresponding to the sample multimodal feature and the sample response heat map, wherein the plurality of first convolution results are obtained through a first convolution operation performed on the image corresponding to the sample multimodal feature and the sample response heat map at different sampling rates;

splicing the plurality of first convolution results to obtain a spliced result;

performing a second convolution operation on the spliced result to obtain a second convolution result;

upsampling the second convolution result to obtain a sample segmentation result;

determining a loss value of the sample segmentation result relative to an actual segmentation result of the sample image; and in a case where the loss value is less than a set threshold, stopping training the initial image segmentation model and using an image segmentation model with the loss value less than the set threshold as the target image segmentation model; and in a case where the loss value is not less than the set threshold, continuing to train the initial image segmentation model until the loss value is less than the set threshold.

11. An electronic device, comprising:

at least one processor; and a memory configured to store at least one program;

wherein the at least one program, when executed by the at least one processor, causes the at least one processor to perform the following steps:

fusing a visual feature corresponding to an original image with a text feature corresponding to a description language to obtain a multimodal feature, wherein the description language is used for specifying a target object to be segmented in the original image;

determining a visual region of the target object according to an image corresponding to the multimodal feature and recording an image corresponding to the visual region as a response heat map; and determining a segmentation result of the target object according to the image corresponding to the multimodal feature and the response heat map, wherein determining the visual region of the target object according to the image corresponding to the multimodal feature comprises:

performing correlation filtering on the image corresponding to the multimodal feature to obtain the visual region of the target object.

12. The device of claim 11, wherein performing the correlation filtering on the image corresponding to the multimodal feature to obtain the visual region of the target object comprises:

determining a convolution kernel according to the text feature; and performing a convolution operation on the image corresponding to the multimodal feature according to the convolution kernel to obtain the visual region of the target object.

13. The device of claim 11, wherein the visual feature comprises visual features extracted from the original image under at least two resolutions separately.

14. The device of claim 13, wherein fusing the visual feature corresponding to the original image with the text feature corresponding to the description language to obtain the multimodal feature comprises:

sorting at least two visual features in an order of sizes of the resolutions to obtain a sorting result; and mapping, through a mapping matrix, the text feature to a feature space where a first visual feature corresponding to a first resolution in the sorting result is located, wherein the first resolution has a smallest value;

splicing the first visual feature with the mapped text feature to obtain a first spliced feature; and upsampling the first spliced feature, splicing the upsampled first spliced feature with a second visual feature corresponding to a second resolution in the sorting result to obtain a second spliced feature, and cyclically performing upsampling and splicing operations until an upsampled spliced feature is spliced with a visual feature having a largest resolution in the sorting result to obtain the multimodal feature, wherein the second resolution is greater than the first resolution and a smallest resolution except the first resolution.

15. The device of claim 11, wherein determining the segmentation result of the target object according to the image corresponding to the multimodal feature and the response heat map comprises:

inputting the image corresponding to the multimodal feature and the response heat map into a target image segmentation model and acquiring an output result of the target image segmentation model as the segmentation result of the target object.

16. The device of claim 15, wherein a training process of the target image segmentation model comprises:

acquiring a sample image and a sample description language and extracting a sample visual feature of the sample image and a sample text feature of the sample description language, wherein the sample description language is used for specifying a sample target object to be segmented in the sample image;

fusing the sample visual feature with the sample text feature to obtain a sample multimodal feature;

determining a sample visual region of the sample target object according to an image corresponding to the sample multimodal feature and recording an image corresponding to the sample visual region as a sample response heat map; and training an initial image segmentation model according to the image corresponding to the sample multimodal feature and the sample response heat map to obtain the target image segmentation model.

17. A non-transitory computer-readable storage medium, which is configured to store a computer program which, when executed by a processor, causes the processor to perform the following steps:

fusing a visual feature corresponding to an original image with a text feature corresponding to a description language to obtain a multimodal feature, wherein the description language is used for specifying a target object to be segmented in the original image;

determining a visual region of the target object according to an image corresponding to the multimodal feature and recording an image corresponding to the visual region as a response heat map; and determining a segmentation result of the target object according to the image corresponding to the multimodal feature and the response heat map, wherein determining the visual region of the target object according to the image corresponding to the multimodal feature comprises:

performing correlation filtering on the image corresponding to the multimodal feature to obtain the visual region of the target object.

\*    \*    \*    \*    \*